3,630,939
COMPOSITIONS AND METHODS FOR THE PRODUCTION OF CHEMILUMINESCENT COLD LIGHT

Harold W. Schneider, c/o The Varniton Co., Box 433, North Palm Springs, Calif. 92258
No Drawing. Filed Jan. 14, 1969, Ser. No. 791,155
Int. Cl. C09k 3/00
U.S. Cl. 252—186                    7 Claims

ABSTRACT OF THE DISCLOSURE

Chemiluminescent cold light of selected color to continue for up to six days duration is produced by the intimate mixture of a luminol-dimethylsulfoxide mixture, with a less than 20% by volume water solution of dimethylsulfoxide saturated with a hydroxide, with the mixture and solution initially maintained in the presence of air. The addition of fluorescein may be made to change the color of the light. Methods of producing the chemiluminescent cold light are also described.

---

The present invention relates to compositions of matter and methods for the direct generation of chemiluminescent light from chemical energy.

It has been appreciated that compounds such as luminol, oxalyl peroxide chloride, calcium disilicide, and lucigenine, for example, generate light, but with very short life (on the order of from 30 seconds to 45 minutes), and numerous attempts have been made to improve and enhance the light-emitting longevity of these compounds, but with little success. Quite surprisingly, however, I have discovered that superior longevity results are obtained by allowing 5 - amino - 2, 3 - dihydro-1,4-phthalazinedione (luminol) to react, in an organic solvent, in the presence of a critical volume of water. This volume of water provides a solvent to permit an ionic reaction to occur, when methods are properly carried out. This discovery relates to my invention.

Furthermore, I have discovered that an organic solvent, such as dimethyl sulfoxide, a critical volume of water, sodium or potassium hydroxide, and luminol provide a superior composition of matter for producing chemiluminescence, with an extraordinary longevity of, for example, six days, when reacted with a specific volume of oxygen in air because, under those circumstances, a prolonged ionic reaction of the dianion of luminol can be caused to occur.

In order to increase the intensity of chemiluminescent light, the prior art had noticed that the addition of small amounts of fluorescein would enhance the light intensity. When fluorescein is added by my methods, approximately 500 times the normal light brightness can be achieved.

It had been found that, when 1% by volume or less of water is used with a dimethyl sulfoxide-luminol solution in the presence of air, an ionic reaction was prevented from occurring and no appreciable longevity resulted. Also, it had been found that when 20% by volume or more water was used, a quenching action took place and chemiluminescent light was quickly quenched.

The present invention also related to novel methods for increasing the longevity of luminol chemiluminescence, inasmuch as there is a current need for a reliable, continuous chemiluminescent light having hours and days duration, rather than minutes duration. For example, the chemiluminescent light of my invention may be employed as follows:

As an all-night marking light on land or sea; to substitute, in the case of even extended electric power failure; for illumination in homes, hospitals, offices and the like; in localities where it is undesirable to employ electric illumination because of hostile aircraft, for example; as a liquid or with pastes or waxes incorporated therewith; and even when employed over extensive periods (as hours or days) is substantially harmless and is a so-called cold light, are some of the attributes of my light.

To provide a light for these and other desirable purposes, I discovered that, when dimethyl sulfoxide plus 2% by volume water and an excess of solid sodium hydroxide or potassium hydroxide, were heated to not less than 60° C., in the presence of oxygen of the air, that substantial chemiluminescent light was instantly generated. I further found that the solution could be heated to 100° C. without any decrease in light output, brilliance or longevity. In addition, I found that, once the chemiluminescent reaction had been initiated at 60° C., lowering the temperature to 0° C. did not stop or decrease the output of chemiluminescent light. During in vitro experiments, I noticed that, when a bottle (275 cc.) containing 100 cc. of this fluid (luminol, 2% by volume water, dimethyl sulfoxide, excess sodium or potassium hydroxide) was shaken, that an extremely brilliant cold light was generated, having maximum light output which continued about one minute. I further discovered that, when this chemiluminescent fluid became quiescent, the uppermost ¼ inch of fluid emited light constantly. It was observed that this constant light emission, derived from the above composition under quiescent conditions in an open container, lasted for six days at which time no further chemiluminescent light could be generated by either the addition of more water, more caustic or more oxygen from air. When an attempt was made to bubble a stream of air through fresh fluid, the composition quickly picks up excess oxygen which acted as a quenching agent and no light was released. The same quenching action was observed when pure oxygen, in place of air, was bubbled through the fluid. It was also found that, on standing, excess oxygen was given off and the liquid then emitted light in the usual way.

I have also discovered in practice that it is important to heat, to a minimum of 60° C. the aqueous caustic solution of luminol in dimethyl sulfoxide in order to initiate conditions for the formation of adducts of oxygen directly in a triplet excited state which can react with the soluble dianion of luminol. Below this temperature (60° C.) I have observed that the only light which is generated is specifically localized on the surface of the sodium or potassium hydroxide pellets at the bottom of the fluid at a temperature as low as 13° C. At a temperature of 10° C. no light from the caustic pellets was visible to the human eye. I have discovered that it is necessary to maintain a saturated aqueous caustic solution in dimethyl sulfoxide at a pH of 8–9 in order to insure the constant formation of the dianion of luminol. It was found that a 1% by volume water solution of dimethyl sulfoxide gave good results, but that a 2% by volume water solution of dimethyl sulfoxide gave the best results. It was found that excellent results for this reaction occurred when up to 5% by volume water dimethyl sulfoxide was used, but as the water concentration increased as, for example, towards 20% by volume, the chemiluminescent light became quenched. Adding water to dimethyl sulfoxide above 20% by volume quickly quenches all light output. It was also noticed that, at room temperature, no visible light was emitted and, therefore, the background value of light coming from this composition was for all practical purposes, zero in value. This is in contrast to a water, luminol, caustic, hydrogen peroxide (plus a trace of catalyst) where, in the dark at room temperature, a low level emission of chemiluminescent light, easily visible to the adapted eye, will be given off for many hours. Best results are achieved by using not less than 5 milligrams of luminol per ml. of fluid.

Certain water-soluble coloring agents such as rhodamine "B" and fluorescein are added to luminol solutions, and such solutions will emit colored light. The natural color of the luminol chemiluminescent light is blue and, when rhodamine "B" is used, an orchid colored light results in water solutions. When fluorescein is used in water solutions a yellow green light of much brilliancy is given off.

As specific examples of compositions of matter to provide a bluish chemiluminescent light, substantially 0.1 gram of 3-amino-phthalhydrazide (luminol) is dissolved in substantially 1 liter of dimethylsulfoxide saturated with sodium or potassium hydroxide (commercial; ground flake or U.S.P. XV, for example), containing a trace of water (tap, distilled or sea water may be employed). By "trace" is meant substantially 2 milliliters. Chlorine or fluorine in the water has no detrimental effects on the value of the composition of matter.

For the production of yellow green chemiluminescent light, a composition of matter is prepared by adding substantially 0.1 gram of 3-aminophthalhydrazide to substantially 1 liter of dimethylsulfoxide, saturated with sodium or potassium hydroxide (as above), containing water, to which is added substantially 10 milligrams of fluorescein powder (uranine salt).

In both cases as above, the ingredients may be mixed by ordinary manual shaking in a conventional stoppered glass container. Air is not evacuated therefrom, and all steps may be carried out at room temperatures or thereabouts, except that, if desired, the mixing of the luminol and dimethylsulfoxide may be carried out at initially a temperature of not less than 60° C. The chemiluminescent light is generated at once.

For commercial production of the compositions of matter for subsequent use, a solution of luminol in the dimethylsulfoxide with fluorescein (for yellow green chemiluminescent light) is contained in one receptacle or compartment of a receptacle, and a dimethylsulfoxide solution saturated with either sodium or potassium hydroxide containing water is contained in a second container or second compartment of a receptacle. In any suitable way, the two compositions of matter are mixed together, with vigorous shaking; although stirring may be employed. If left undisturbed after initial production of the chemiluminescent light, the light will continue for substantially six days.

The addition of Rhodamine "B" or methyl cellulose may be made as is well known in this art.

Of course, an increase of 1.01 gram per liter of dimethyl-sulfoxide will increase the brightness of the chemiluminescent light.

While I have used, in some of my investigations and experiments, a temperature of 60° C. or above room temperature, the method may be carried out at lower temperatures, such as room or even at a temperature of, say, 15° C., for example, for obviously, the methods may have to be carried out where an elevated temperature is impossible to be had.

What is claimed is:

1. Method of producing chemiluminescent cold light which comprises the steps of (1) intimately mixing substantially 0.1 gram luminol with substantially 1 liter dimethylsulfoxide; (2) intimately mixing less than a 20% by volume water solution of dimethylsulfoxide saturated with a hydroxide selected from the group consisting of sodium hydroxide and potassium hydroxide; and (3) intimately mixing the products of steps 1 and 2 in the presence of oxygen.

2. Method of producing chemiluminescent cold light which comprises the steps of (1) intimately mixing at an initial temperature of not less than 60° C. substantially 0.1 gram luminol with substantially 1 liter dimethylsulfoxide and substantially 10 milligrams fluorescein; (2) intimately mixing less than a 20% by volume water solution of dimethylsulfoxide saturated with a hydroxide selected from the group consisting of sodium hydroxide and potassium hydroxide; and (3) intimately mixing the products of steps 1 and 2 in the presence of oxygen.

3. A composition of matter for the production of chemiluminescent cold light on exposure to oxygen, said composition of matter consisting essentially of 0.1 gram luminol in 1 liter dimethylsulfoxide that is intermixed with an aqueous dimethylsulfoxide water solution saturated with a hydroxide selected from the group consisting of sodium hydroxide and potassium hydroxide, the aqueous dimethylsulfoxide water solution being less than 20% by volume water.

4. A composition of matter according to claim 3 characterized in that the aqueous dimethylsulfoxide water solution is 2% by volume water.

5. A composition of matter according to claim 3 characterized in that the aqueous dimethylsulfoxide water solution contains substantially 10 milligrams fluorescein powder.

6. A composition of matter for producing chemiluminescent cold light in the presence of oxygen, said composition of matter consisting essentially of luminol and dimethylsulfoxide water solution saturated with a hydroxide selected from the group consisting of sodium hydroxide and potassium hydroxide, the aqueous dimethylsulfoxide water solution having less than 20% by volume water.

7. A composition of matter according to claim 6 characterized in that the composition of matter contains substantially 10 milligrams fluorescein.

References Cited

UNITED STATES PATENTS 3,213,440   10/1965   Gesteland _____ 252—188.3

JOHN D. WELSH, Primary Examiner

U.S. Cl. X.R.

252—188.3, 301.2, 408; 240—1